United States Patent

[11] 3,609,674

| [72] | Inventor | Siegfried Hansen |
| | | Los Angeles, Calif. |
| [21] | Appl. No. | 868,143 |
| [22] | Filed | Oct. 21, 1969 |
| [45] | Patented | Sept. 28, 1971 |
| [73] | Assignee | Hughes Aircraft Company |
| | | Culver City, Calif. |
| | | Continuation-in-part of application Ser. No. 675,491, Oct. 16, 1967. |

[54] SEISMOMETER
6 Claims, 4 Drawing Figs.

[52] U.S. Cl. ................................................. 340/17
[51] Int. Cl. ................................................. G01v 1/16
[50] Field of Search ....................................... 340/17

[56] References Cited
UNITED STATES PATENTS
2,751,573  6/1956  Millington ..................... 340/17
3,059,218  10/1962  Baker ........................... 340/17
3,065,456  11/1962  Alexander ..................... 340/17
3,199,072  8/1965  Willmore et al. ............... 340/17

Primary Examiner—Rodney D. Bennett, Jr.
Assistant Examiner—Brian L. Ribando
Attorneys—James K. Haskell and Allen A. Dicke, Jr.

ABSTRACT: The seismometer has motion-sensing means and recentering means for recentering the seismic mass to a zero position. It employs displacement sensors, preferably in two coordinates, to emit an output signal upon seismic mass motion. The displacement signal serves as an output signal and, in addition, is fed back to the seismic mass centering means for optimum damping and recentering. The feedback through three channels of functionally different characteristics provides optimum feedback for broadband sensitivity and response.

PATENTED SEP 28 1971 3,609,674

INVENTOR.
SIEGFRIED HANSEN,
BY
Allen A. Dicke, Jr.,
AGENT.

SEISMOMETER

CROSS-REFERENCE

This application is a continuation-in-part of application, Ser. No. 675,491, filed Oct. 16, 1967.

BACKGROUND

This invention relates to a seismometer having an improved band-pass. Feedback stabilization is provided to the seismic mass, including recentering feedback. The feedback includes three channels: a straight-gain channel, a differentiated channel and an integrated channel. Such feedback provides a seismometer which has a response band-pass from shorter to longer periods than is conventionally available.

Conventional seismometers comprise a mass which is movable relative to a base, which base is mounted to move with horizontal earth motion. Conventional seismometers includes suspended and inverted pendulums. Such pendulums are provided with critical damping, and such damping limits short period responses. Furthermore, with high-gain readout, the readout often goes off scale for moderate seismic motions, and at the same time, the high gain results in a limited signal-to-noise ratio for small seismic perturbations.

The bubble seismometer of the above-identified Siegfried Hansen application, Ser. No. 675,491, employs feedback, which feedback is employed for dynamic damping. Such feedback improves the signal-to-noise ratio at high gain, but reduces the band-pass. Accordingly, instruments of larger band-pass which yet retain sensitivity and desirable signal-to-noise ratio are required.

SUMMARY

In order to aid in the understanding of this invention, it can be stated in essentially summary form that it is directed to a seismometer having improved feedback to provide a seismometer having a wide band-pass and useful sensitivity characteristics. The desirable ends are accomplished by employing three channels of feedback from seismometer mass displacement sensors. The three feedback channels are a proportional channel, a differentiated channel and an integrated channel. These provide a useful output signal at short periods, provide recentering and provide a properly high long-period cutoff.

Accordingly, it is an object of the present invention to provide an improved precision seismometer having a wide bandpass. It is a further object of the present invention to provide an improved seismometer which employs a relatively simple feedback system, which provides a desirable signal-to-noise ratio and a desirable band-pass. It is another object to provide a seismometer having optimum feedback for proper damping, which yet provides a wide band-pass, together with sensitivity and a satisfactory signal-to-noise ratio. It is a further object to provide a seismometer which is self-centering through the employment of feedback. It is still another object to provide feedback from seismometer displacement which incorporates feedback proportional to displacement, as well as time integrated and differentiated feedback signals. Other objects and advantages of this invention will become apparent from the study of the following portion of the specification, the claims and the attached drawings.

DESCRIPTION

Figure 1:
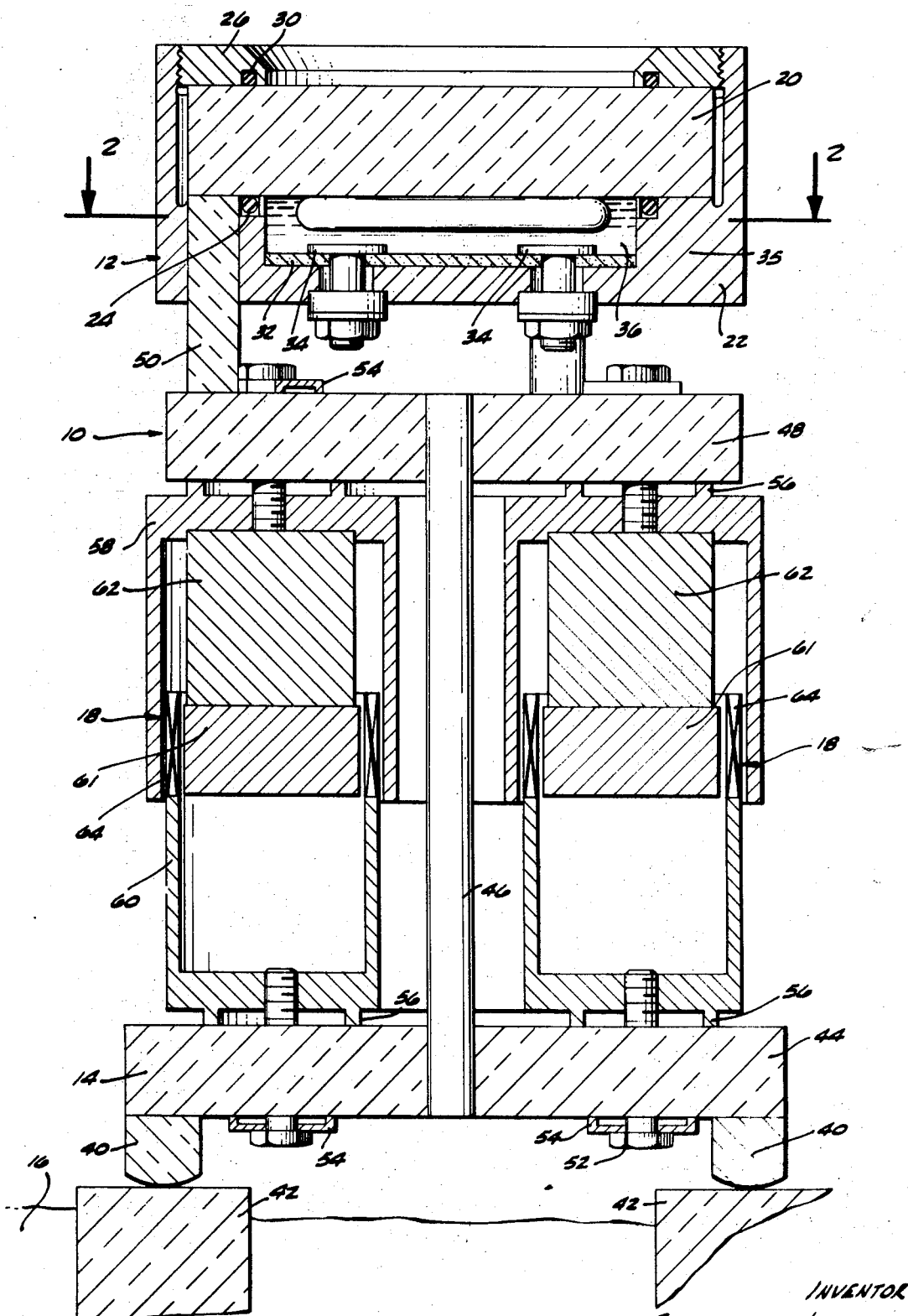
FIG. 1 is a vertical section taken through the seismometer of this invention, along the line 1—1 of FIG. 2.
Figure 3:
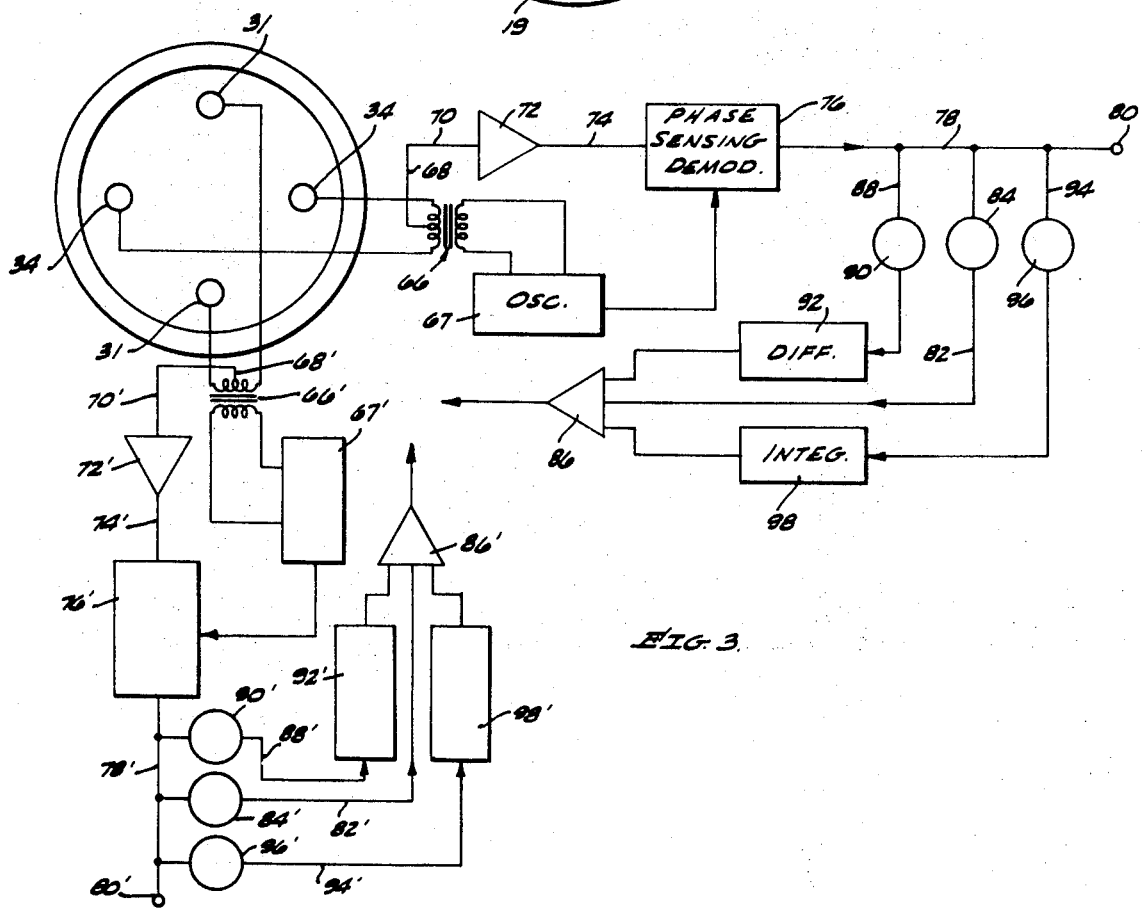
FIG. 3 is a schematic view of the bubble chamber of the seismometer of this invention, together with a schematic circuit diagram showing the feedback arrangements.

Referring to FIGS. 1 and 3, the basic concept of the improved precision seismometer 10 of the present invention is clearly shown. Basically, the seismometer comprises a bubble level sensor 12, which stands on quartz frame 14 for supporting the sensor in fixed relation with respect to a geologic surface 16 being observed. An example of such a surface would be a rock formation associated with a geological fault, or in other applications of the invention, may comprise another critical surface, such as an optical bench. In addition to the above, the basic structure of the seismometer 10 further includes positioning correcting orthogonally arranged pairs of force coils 18 and 19.

The bubble level sensor 12 comprises an optically flat plate or quartz disc 20 and a bubble chamber 22. Chamber 22 is attached in sealed relationship to the flat quartz plate 20 by means of an O-ring gasket 24 which is compressed into sealed engagement against the underface of the quartz plate through the clamping pressure exerted by the clamping ring 26. Clamping pressure is developed by the threaded interconnection of clamping ring 26 with the annular flange of the bubble chamber 22. The clamping ring 26 is sealed by O-ring gasket 30 against the top face of the plate 20 to prevent dust and dirt from entering into the bubble chamber 22, and to prevent loss of fluid.

Figure 2:
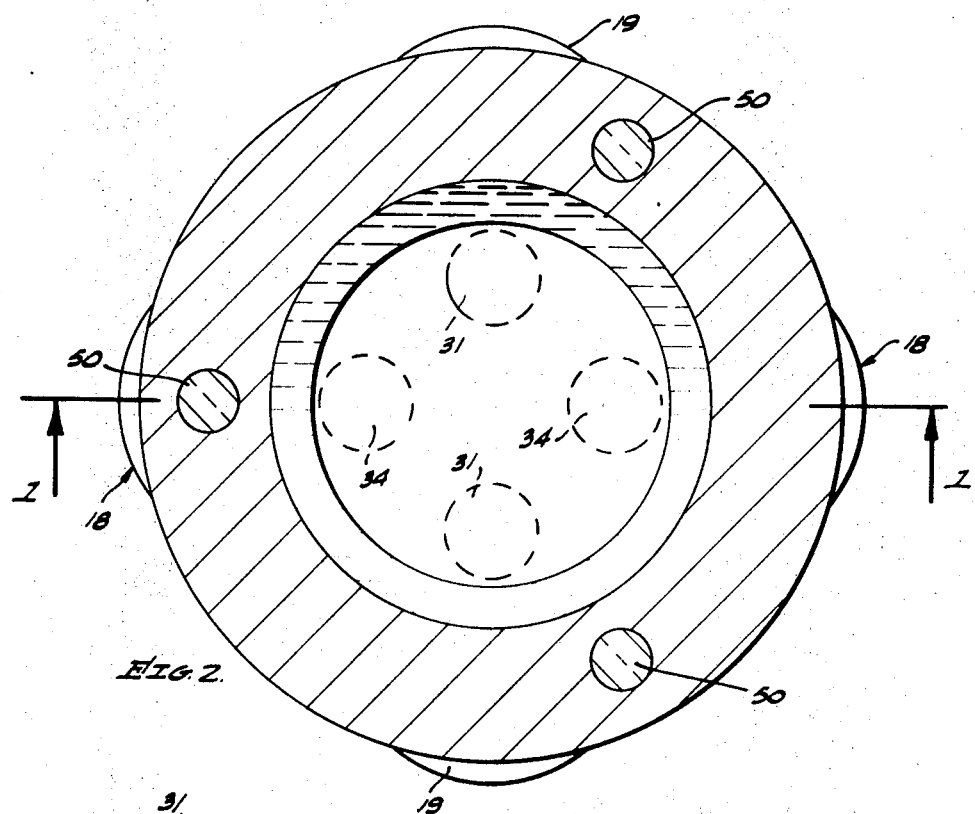
FIG. 2 is a horizontal section taken through the bubble chamber of the seismometer of this invention, along the line 2—2 of FIG. 1.

Electrically, the bubble chamber 22 comprises an insulating lining 32 which, for example, can be formed of suitable insulating material, such as Teflon. The insulating lining 32 permits contact pairs 31 and 34 to be electrically isolated from the conductive ring 35 of the bubble chamber, but to be disposed in electrical contact with the conductive liquid 36. Liquid 36 is a low viscosity high mass liquid, such as ethyl alcohol, which partially fills the bubble chamber 22. The contacts 31 and 34 are disposed in an orthogonal array along perpendicularly disposed X and Y axes, as can be seen in FIGS. 2 and 3. As is later described, the position of the bubble with respect to the contacts materially affects the conductance between these contacts and the conductive ring 35 of the bubble chamber.

As described in Applicant's copending application, Ser. No. 519,673, filed Aug. 5, 1965, entitled "Precision Tilt Meter," the undersurface of the quartz disc-shaped plate 20 provides an accurately flat surface. The plate 20 is preferably ground to be flat within 1 microinch. The texture of this surface is produced by a grinding technique whereby a matte finish is obtained without losing its accurately flat configuration.

One method of obtaining such a surface is to use 1,800 carborundum grit that is applied to the surface of the plate with a conventional optical grinding tool. The surface is then abraded for a 2-to-3 minute period. By utilizing such a grinding compound in the above-described manner, the plate will retain an optically flat configuration including a network of interconnected miniscule pockmarks. The bubble lies against this undersurface. A surface ground in this manner reduces both the surface tension around the peripheral edge of the bubble and also eliminates the formation of a film of impurities that would otherwise develop as a result of the evaporation of the liquid. Such a precaution is necessary to enable the surface to perform as a wick to prevent momentary hesitations of bubble movement that would otherwise adversely affect the response of the sensor.

In this preferred embodiment of the present invention, the entire supporting structure between the bubble level sensor and the surface 16 of a geological formation being observed is composed substantially entirely of fused quartz. This selection of material minimizes dimensional changes of the support structure that ordinarily occur whenever the ambient temperature of the environment in which the seismometer is situated changes from the initial condition.

The structure of the support can be clearly seen in FIG. 1. The portion of the support resting on the geological surface 16 comprises three depending base members or feet 40 resting upon previously leveled fused quartz blocks 42 inset in the surface 16. The support structure further comprises a lower circular member 44 having a central stem 46 which supports an upper circular member 48, of similar configuration. Member 48 is provided with three upstanding lugs or pins 50 upon which rests disc 20 of the bubble sensor 12. Stem 46 may be made of quartz, or of a metal resistant to thermal change and having a suitable strength and modulus of elasticity.

As will be described in the description of the operation of the seismometer, force coils 18 are utilized to apply pressure between the upper and lower circular members 44 and 48 to cause a slight bending of stem member 46 to thereby tilt the bubble sensor with respect to its base. Since the geologic surface 16 usually is subjected to continuous small seismic activity, this releveling process will also be continuous, as is hereinafter described. If, by chance, the geological surface or other critical surface being observed is in a position where the seismometer is tilted in the initial orientation when the seismometer is set up, the bubble will be returned to a position substantially central with respect to the contact terminal pairs 31 and 34. (See FIG. 2.)

In order to attain accurate displacement of the upper circular member 48 and, hence, the optical flat, the structures forming the force coils 18 are attached to both the upper and lower circular members by means of bolt assemblies 52, which apply uniform clamping forces between the raised edge washers 54 and the annular protrusions 56 formed on each end of the force coil elements. It is important that the forces applied by the bolts between the washers 54 and the protrusions 56 be in alignment with each other to eliminate the possibility of fracturing the fused quartz material forming the upper and lower circular members 44 and 48 of the support.

The force units 18 are of conventional construction. They comprise telescopically engaging upper and lower cup members 58 and 60, respectively. Each of the cup members is formed of suitable magnetic material whereby a magnetic circuit is maintained therebetween. Each of the force units further includes an alnico core 62 situated in each upper cup member and pole piece 61, all of which are formed of magnetic materials. Windings 64, utilized to actuate the force coils 18, are disposed adjacent the top extremity of the lower of the cup members. By referring to FIG. 1, it can be seen that, when the electrical windings 64 are energized, the telescopic cuplike members are moved toward each other or away from each other, depending upon the direction of current flow in the windings 64. This movement is exerted between the upper and lower quartz plates to flex stem 46 which, in turn, reorients the spatial disposition of the bubble sensor to bring the bubble 38 to a state of rest.

FIG. 3 shows the electrical system utilized to cause the bubble to assume a stationary position in response to tilt changes or to seek such a position when the tilt action is continuous. The contacts 34 lie along the X-axis and contacts 31 are disposed along a perpendicularly disposed Y-axis. The disposition of these contacts is such that, when the optical flat 18 is disposed in a level orientation, the bubble 38 will be stationary with respect to the contact pairs 31 and 34 and the intersection of the X and Y coordinates. Any motion of geologic surface 16 will cause the bubble to move, thereby changing the conductance between the contacts and the grounded sidewall 35 of the bubble chamber. If, for example, the change is along the direction of the X-axis, an imbalance will be set up in the transformer 66 to which the contacts 34 are connected. The primary winding of this transformer is provided with an AC-energizing signal supplied from a conventional oscillator 67 at, for example, 1000 cps.

The imbalance signal with respect to the ground reference of the conductive ring 35 appearing at the center tap 68 of the transformer is connected by the conductor 70 to a conventional AC amplifier 72. An example of a suitable amplifier is found in the literature. The output of the amplifier 72 is connected by the line 74 to the input of a conventional demodulator 76 which is also supplied with the oscillator signal.

The electrical output of phase-sensing demodulator 76 is connected by line 78 to output terminal 80. The electrical signal at output terminal 80 is, thus, an analogue of the bubble velocity on the X-axis which, in turn, is related to both tilt and horizontal acceleration on the X-axis. In seismometer service, tilt is expected to be slight at each seismic occurrence, so that the principal output is horizontal acceleration on the X-axis, due to earth acceleration on that axis.

Feedback is employed to damp the seismometer and to recenter the seismometer after a seismic event. Feedback is accomplished through three different channels. Feedback line 82 is connected through variable resistance 84 and to amplifier 86. Feedback line 82, thus, provides an input signal to amplifier 86 which is proportional to the signal at output terminal 80. Feedback line 88 is also connected to line 78 and is connected through variable resistance 90 and differentiator 92 to amplifier 86. Feedback line 88 thus provides the amplifier with a time-differentiated signal differentiated from the signal at output terminal 80. Similarly, feedback line 94 is connected through variable resistor 96 and integrator 98 to amplifier 86. It, thus, provides a time-integrated signal to amplifier 86 from the signal in line 78.

Variable resistors 84, 90 and 96 can be ordinary wire-wound variable resistors or potentiometers for adjusting the proportionality of the various signals. Amplifier 86 is capable of receiving three separate signals, additively combining them and providing a combined amplified output. The differentiator 92 and integrator 98 are of conventional configuration and are preferably combined with the amplifier on a custom chassis.

The output of amplifier 86 is connected to serially connected winding 64 of force coil structures 18, which lie along the same orthogonal axis as the contacts 34. The force coils are connected to each other and to the amplifier in such a way that the output signal from the amplifier tends to apply forces which restore the bubble in liquid 36 to a stationary condition.

A similar electrical connection is provided for contacts 31 and force coils 19 along the Y-axis, which electrical signal and feedback system is identical to that previously described and is identified in FIG. 3 by the same numbers carrying a prime. Thus, two orthogonal output signals are available at output terminals 80 and 80' and two orthogonal damping and restoring systems are active.

A bubble seismometer is illustrated in FIGS. 1, 2 and 3, which bubble seismometer is more fully described in the above-identified Pat. application, Ser. No. 675,491. Such a bubble containment and position-detecting structure is especially useful as the detecting element of the seismometer of this invention, particularly when the bubble structure is integrally equipped with the illustrated feedback force coils. However, it is clear from the following discussion that the seismometer of this invention can just as well incorporate other types of seismic motion-detecting structure. For example, either a conventional downward-hanging pendulum seismometer or an inverted pendulum seismometer could be employed as the seismic motion-detecting means, so long as they incorporate detecting means for detecting the motion of the seismic mass with respect to the geologic support.

However, recentering and damping means between the geologic support and the pendulum support would need to be incorporated and, in accordance with the present teaching, such feedback is preferably in the form of the force coils illustrated principally in FIG. 1. Thus, such force coils would be orthogonally arranged between the geological support and the pendulum mounting when orthogonal readout is available for seismic mass motion.

It will be appreciated, however, that the bubble seismometer or a properly designed inverted pendulum-supported seismic mass are small enough for use in locations where access is restricted. Such locations of restricted access are earth boreholes, for example. The bubble reacts to horizontal acceleration, including that of seismic character, in the same way as gravitational acceleration under tilt conditions.

Figure 4:
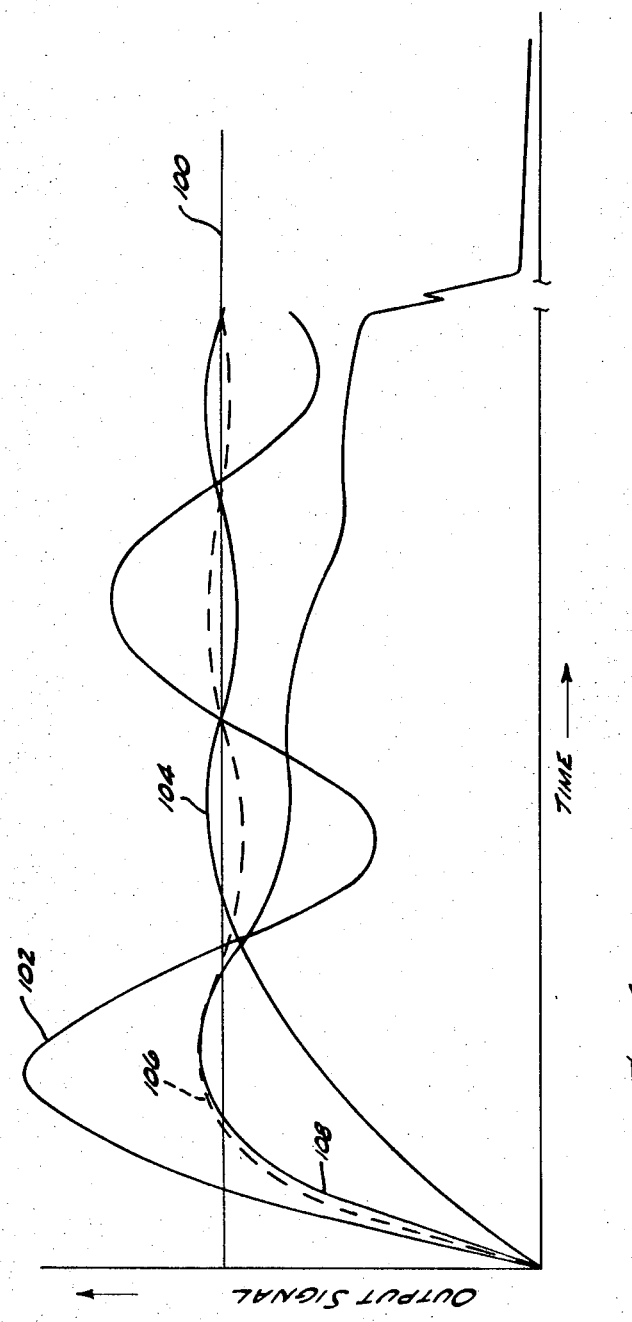
FIG. 4 is a graph showing an input signal applied to and output signals obtained from the seismometer, the signals plotted with time as the abscissa.

Referring to FIG. 4, the significance of the feedback character becomes apparent. FIG. 4 is a graph showing the output signal at one of the output terminals as the ordinate, with time as the abscissa. The input signal to the seismometer is indicated by line 100, which represents a step function in the form of a quickly occurring tilt or a quickly occurring constant horizontal acceleration. If only the conventional proportional feedback were employed, as is conventional in critical damping, the output signal would rise asymptotically from zero to the level of the step function at line 100. Critical damping thus limits the short period response of the instrument so that it is inadequately responsive to short period seismic occurrences. Such conventional proportional gain at the critical damping level would be of the type that would result from feedback only along line 82 with variable resistor 84 adjusted for critical damping. However, when a shorter period of response is desired, resistor 84 can be adjusted so that there is excessive proportional or straight gain feedback. The output signal in such a circumstance is illustrated by curve 102. Should the feedback gain be sufficiently high, the system could become unstable with continued oscillation or increasing oscillation. Curve 102 illustrates excessive ordinary straight gain or feedback which is of such value to cause ultimate stabilization, but with such preliminary perturbations that the output signal is of little value. When the differential gain through line 88, variable resistor 90 and differentiator 92 is added to straight gain of ordinary critical damping value, a response illustrated by curve 104 is obtained. However, it is seen that the critically damped proportional gain plus differentiated gain is not properly responsive to short period perturbations. When excessive straight gain through line 82 and properly adjusted differential gain through differentiator 92 are combined, the response is shown by dotted line curve 106. It is seen by this curve that short period response is enhanced and the output signal quickly corresponds to the seismic event.

However, when high gain is employed in seismometers, so that small seismic events can be detected, seismic events of moderate scope put the seismometer off scale. Thus, recentering is necessary for proper continued operation of the seismometer. To obtain recentering, an integrated signal is obtained through line 94, variable resistor 96 and integrator 98. When such is employed, recentering is obtained as is illustrated by the response curve 108. With the addition of the time-integrated signal, the output has the same fast response as curve 106, so that short period response is very much more satisfactory than ordinary straight gain critical damping. The amount of time-integrated gain fed to amplifier 86 controls the speed of recentering. The right-hand end of curve 108, beyond the broken portion of the abscissa, can be anywhere from 50 to 200 seconds, depending upon the desired speed of recentering and the maximum period bandwidth cutoff. In such feedback systems, when they are properly adjusted, the low period cutoff can be as low as ½-second, while the high period cutoff can be anywhere from 50 to 200 seconds, as noted above. Accordingly, the three-path feedback provides for optimum signal output.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A seismometer, said seismometer comprising:
    sensing means for sensing motion, said sensing means having an output signal corresponding to motion of said sensing means;
    adjustable mounting means, said adjustable mounting means being adapted to be mounted upon a structure the motion of which is to be sensed, said mounting means carrying said sensing means;
    feedback means connected between said sensing means and said adjustable mounting means so that, upon sensing of motion by said sensing means, said adjustable mounting means is adjusted to overcome the effects of motion detected by said motion sensing means, said feedback means comprising a proportional gain channel, a differentiating channel and an integrating channel.

2. The seismometer of claim 1 wherein said proportional gain channel, said differentiating channel and said integrating channel are arranged in parallel to each other.

3. The seismometer of claim 2 wherein at least two of said proportional gain channel, said differentiating channel and said integrating channel are adjustable in gain.

4. The seismometer of claim 3 wherein said adjustable mounting means is adjusted by electromotive force means, said proportional gain channel, said differentiating gain channel and said integrating gain channel being electrical channels, said electrical channels being connected to the input of an amplifier, said amplifier having an output connected to said electromotive means.

5. The seismometer of claim 1 wherein variable impedance means senses motion of said motion sensing means, an oscillator is connected to said variable impedance means, an amplifier is connected to said variable impedance means to amplify an alternating current signal related to motion of said motion sensing means, and a phase sensing demodulator having an output is connected to said amplifier so that its output provides an output signal proportional to sensed motion.

6. The seismometer of claim 5 wherein said proportional gain channel, said differentiating channel and said integrating channel are each connected to said output.